March 22, 1960  F. T. STONE III, ET AL  2,929,564
SPRAYING DEVICE

Filed Dec. 17, 1956  7 Sheets-Sheet 1

FIG. 1

INVENTORS
FRANZ T. STONE III
ROBERT E. FINCKEL JR
BY
Jerome R. Cox
ATTORNEY

March 22, 1960

F. T. STONE III, ET AL 2,929,564

SPRAYING DEVICE

Filed Dec. 17, 1956

INVENTORS
FRANZ T. STONE III
ROBERT E. FINCKEL JR.
BY

*Jerome R. Cox*
ATTORNEY

March 22, 1960

F. T. STONE III, ET AL 2,929,564

SPRAYING DEVICE

Filed Dec. 17, 1956

INVENTORS
FRANZ T. STONE III
ROBERT E. FINCKEL JR.
BY

*Jerome R. Cox*
ATTORNEY

INVENTORS
FRANZ T. STONE III
ROBERT E. FINCKEL JR.
BY
Jerome R. Cox
ATTORNEY

March 22, 1960   F. T. STONE III, ET AL   2,929,564
SPRAYING DEVICE

Filed Dec. 17, 1956   7 Sheets-Sheet 7

INVENTORS
FRANZ T. STONE III
ROBERT E. FINCKEL JR.
BY
Jerome R. Cox
ATTORNEY

United States Patent Office 2,929,564
Patented Mar. 22, 1960

2,929,564

SPRAYING DEVICE

Franz T. Stone III, Columbus, and Robert E. Finckel, Jr., Mifflin Township, Franklin County, Ohio, assignors to Columbus Automatic Lubrication Company, Columbus, Ohio, a corporation of Ohio Application December 17, 1956, Serial No. 628,681

9 Claims. (Cl. 239—99)

The inventions disclosed in this application relate to devices for applying liquid such as a mold wash, lubricant, or plating material, etc. to molds, dies, etc. and parts cooperating therewith. In many molding, forging, die casting drawing and similar operations it is desirable either to wash the mold parts, to lubricate them or to coat or plate them so as to facilitate the molding, forming, forging or casting operations. By the term "mold" as used hereinafter in this specification and in the claims, we intend to include glass molds, die cavities, forging molds, cooperating die plungers, punches, forging hammers, presses, casting molds, male and female, etc. By the term "liquid" we intend to include lubricants, coatings, plating materials and wash liquids, etc.

In molding, casting or forging metals by means of metallic molds or dies, it is often the practice to spray the mold with a coating or lubricating material to permit the metal to flow better, to prevent severe wear on the mold or die parts, to prevent galling of the metal being cast or formed and to permit the metal to be readily released from the mold. This reduction of wear affords a reduction in tool and die costs and facilitates casting and forging to uniform tolerances and contours. For example, some operators spray molds with an aqueous or oil suspension of graphite and/or other materials to achieve a protective plating of the mold. At one time, and possibly at the present, some operators spray hot molds with an aqueous suspension of finely divided bone ash, finely divided alumina, or other refractory materials. Such a suspension is sometimes called a "mold wash" and serves to improve the quality of the casting and to prevent sticking of the casting to the mold.

The apparatus which we have disclosed herein, effectively and efficiently applies such liquids in spray form to such molds automatically even while the die casting, forging or molding operations, etc. are being carried on at relatively high speeds.

Objects

One object of our invention is to provide a new and improved machine or device for applying liquid as a spray to the operating surfaces of molds.

A further more specific object of our invention is the provision in such a machine of electric controls for operating automatically the various valves involved in our improved machine.

A further more specific object of our invention is the provision in such a machine of means to retard the movement thereof during the spraying operation so as to perform the spraying operation more efficiently while speeding up other portions of the cycle.

A further object of our invention is to provide such a machine with means to purge unused liquid from the supply lines and spray nozzle.

A further object of our invention is the provision in such a machine of means for retaining the sprayhead in constant alignment with respect to the die cavities.

A feature of our invention is the provision of a valve in the liquid supply conduit to better control the amount of liquid used and to allow the use of an inexpensive and readily expendable spraying nozzle.

Further features of our invention are the provision of valves to adjust accurately the speed of the main portion of the movement of the machine and to adjust accurately the speed of the retarded portion of the movement of the machine.

Further objects and features of the invention should be apparent from the following description of a preferred embodiment of our invention when considered in connection with the accompanying drawings and in connection with the annexed claims.

DRAWINGS

In the drawings which disclose a preferred embodiment of our invention.

DETAILED DESCRIPTION

Figure 1:
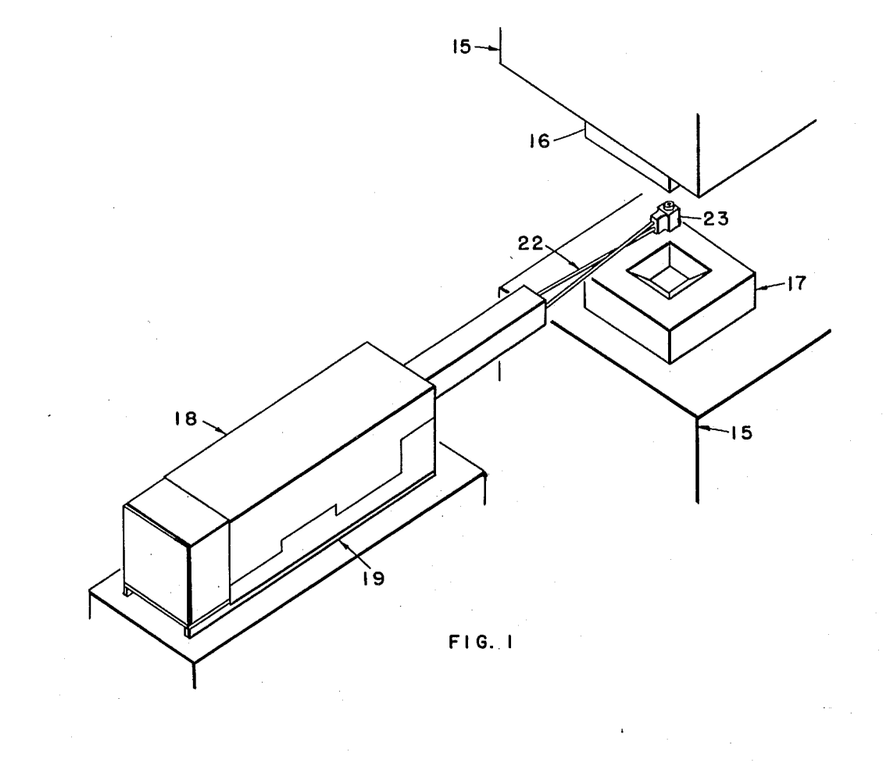
Fig. 1 is a diagrammatic showing of the spraying device or machine of said embodiment showing its relationship when used in conjunction with a forging machine.

Referring to the drawings for a detailed description of the embodiment of our invention, it may be seen that we have shown in Fig. 1 a hydraulic forging press machine 15 having dies 16 and 17 movable from the inoperative position shown to a position of mutual engagement in the forging operation. Associated with the forging press 15 we have shown generally in Fig. 1 and more specifically in Figs. 3 and 4 an embodiment of our improved spraying machine 18 having a main frame generally designated 19 (Fig. 1), a pneumatic cylinder assembly 20 (Fig. 2) containing a piston 21, and a movable connecting slide structure 22 connected to the piston 21 and supporting the spraying head 23.

Main frame 19 comprises a bed portion 24, forward guide support member 25, rear guide support 26, rear cylinder support 27 and a forward cylinder support bracket 28. Support members 25, 26 and 27 are rigidly secured by suitable means to bed portion 24 so as to extend vertically from said bed portion and to be perpendicular thereto. Cylinder support bracket 28 is rigidly attached to the rear face of rear guide support 26 so as to extend rearwardly therefrom.

We have provided, as indicated generally in Fig. 3 and as described below in more detail, means 31 for moving the sprayhead from a retracted position to an operative position and from said operative position to said retracted position; means 32 for supplying liquid to said sprayhead 23; means 33 for supplying air under pressure to said sprayhead; means 34 for aligning the sprayhead; means 35 for controlling the cylinder air supply; means 36 for retarding the piston movement; and means 37 for purging the liquid conduit and the spray nozzle of unwanted liquid.

MEANS FOR REPOSITIONING THE SPRAYHEAD

Figure 3:
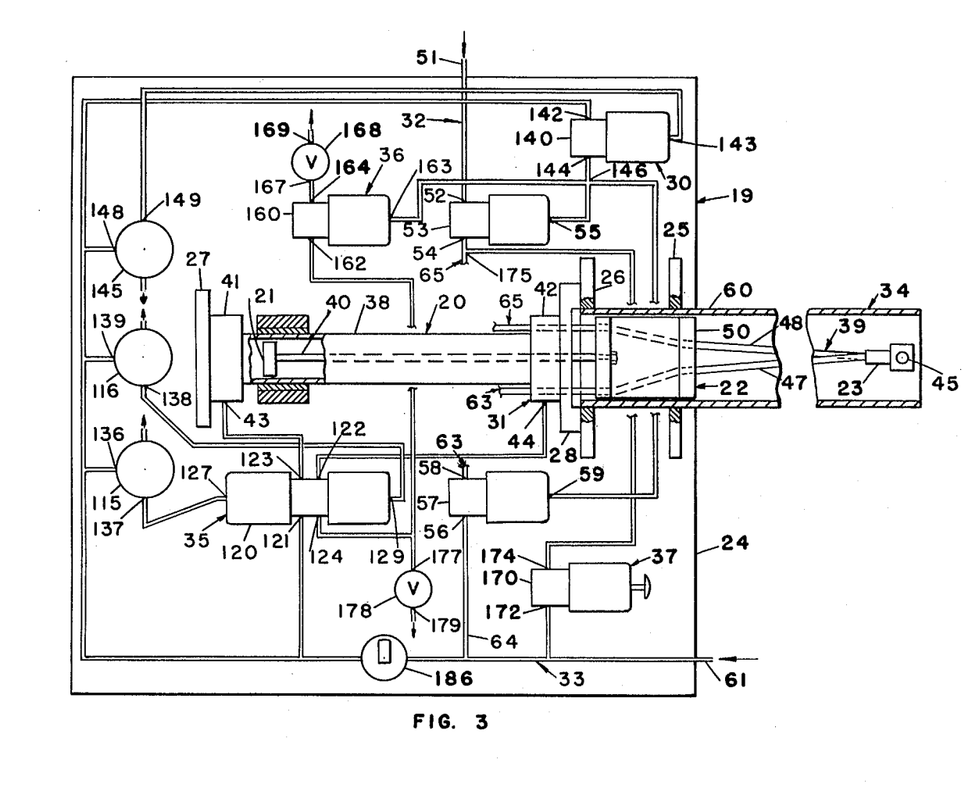
Fig. 3 is a diagrammatic top plan view of said embodiment in retracted position with some parts broken away.

We provide means 31 for moving the spray nozzle from a retracted position to an operative position and from said operative position to said retracted position which comprises a pneumatic cylinder assembly generally designated as 20 in Fig. 3, a connector block 50 and a sprayhead support structure 39, each of which is more particularly described in the next following paragraphs.

Pneumatic cylinder assembly 20 comprises a cylinder 38 of conventional design, a rear cylinder head 41 and a forward cylinder head 42, all of which serve to contain a piston 21 and its attached piston rod 40 which extends forwardly through a central bore of forward head 42 and slides reciprocally therein. Rear cylinder head 41 is provided with an air port 43 and forward head 42 has a similar air port 44. Piston 21 is of conventional design and is secured by suitable means to the rear end of a connecting rod 40 which is driven thereby. The opposite or forward end of connecting rod 40 is formed with a threaded portion whereby the connecting rod is secured to the rear portion of a connector block 50.

The sprayhead support structure 39 comprises an air delivery tube 47 formed of suitable metallic tubing and equipped at its opposite ends with suitable tubing connector fittings, and a liquid delivery tube 48 of similar material and similarly equipped with connector fittings. It supports the pneumatic atomizing spray nozzle head of any suitable design such as sprayhead 23. Our preferred embodiment of the sprayhead 23 is equipped with two oppositely disposed spraying nozzles 45 and 46 (the latter being indicated in Fig. 4) so as to simultaneously deliver two separate sprays of finely divided liquid particles directed oppositely from sprayhead 23. Delivery tubes 47 and 48 are rigidly attached to sprayhead 23 by means of tubing connector fittings which are threadably engaged within two appropriately tapped air and liquid input bores of the sprayhead 23. The opposite or rearwardly extending ends of tubes 47 and 48 are similarly attached to a connector block 50.

MEANS FOR SUPPLYING LIQUID TO SAID SPRAYHEAD

We also provide means generally designated 32 whereby a liquid such as a liquid lubricant is supplied to a spraying head 23. Said means comprises a suitable liquid supply reservoir 51 (see Fig. 8) having an outlet orifice 49 connected by suitable metallic tubing to the inlet port 52 of a normally closed pressure actuated liquid control valve 53 of conventional design. Said means also includes a partially flexible liquid conduit 65 (Figs. 2 and 8) adapted to connect the outlet port 54 of said valve 53 to the liquid delivery tube 48 of sprayhead support structure 39, said tube 48 being connected to a threaded liquid input bore of sprayhead 23 as previously described.

MEANS FOR SUPPLYING AIR UNDER PRESSURE TO SAID SPRAYHEAD

We further provide means generally designated 33 whereby air under pressure is supplied to the sprayhead 23. Said means comprises a suitable air compressor 61 (see Fig. 8), or other source of compressed air having an air delivery port 62 connected by a suitable air conduit 64 to the inlet port 56 of a normally closed, pressure actuated air control valve 57 of conventional design, and a suitable, partially flexible, air conduit 63 (see also Fig. 4) adapted to connect outlet port 58 of said valve to air delivery tube 47 of sprayhead support structure 39. Said tube 47 is connected in the manner previously described to a threaded air input bore of sprayhead 23.

MEANS FOR RETAINING SAID SPRAYHEAD IN CONSTANT ALIGNMENT WITH DIE CAVITIES

We further provide means 34 whereby a sprayhead 23 may be prevented from rotating about the longitudinal axis of connecting rod 40. Said means comprises a connecting slide structure 22, a slide guide sleeve 60, and air and liquid conduits generally designated (in Figs. 3 and 8) as 63 and 65.

Connecting slide structure 22 is shown in detail in Figs. 9, 10, 11 and 12, and comprises a connector block 50 together with six wear plates 79.

Figure 9:
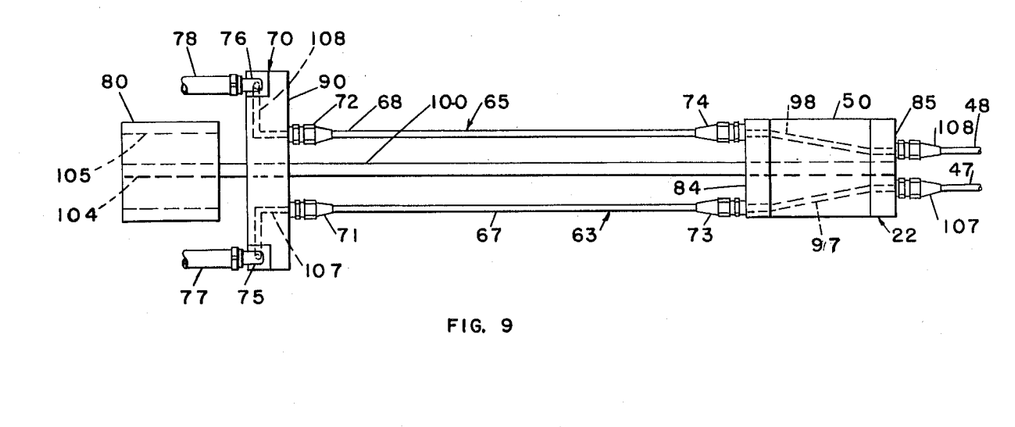
Fig. 9 is a fragmentary plan view having the connecting rod removed and showing the connector block, manifold support bar and manifold, assembled and piped.
Figure 10:
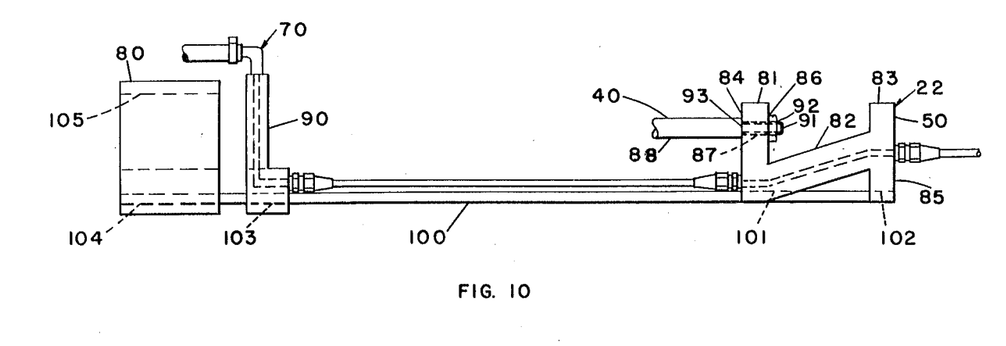
Fig. 10 is a fragmentary view in side elevation of the assembly of Fig. 9.
Figure 11:
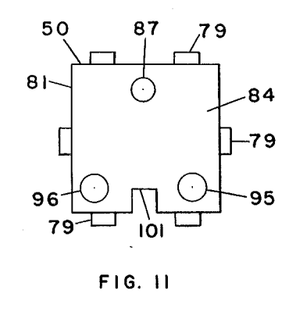
Fig. 11 is a view in elevation of the rear face of the connector block.
Figure 12:
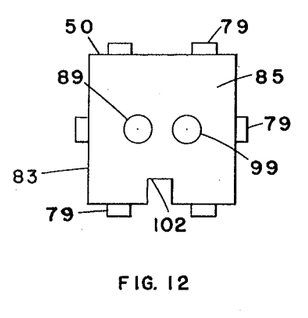
Fig. 12 is a view in elevation of the forward face of the connector block.

Connector block 50 is cast from an appropriate light metal in the form shown in Figs. 9 and 10 so as to have a forward portion 83 and a rear portion 81 interconnected by an angularly extending intermediate portion 82. Rear portion 81 is formed with an inner face 86 and a rear face 84. Said rear face 84 is of square or polygonal configuration as shown in Fig. 11. Forward portion 83 is formed with a forward face 85 of similar configuration as shown in Fig. 12.

A transverse bore 87 of rear portion 81 is so located that it lies parallel to and substantially vertically above the longitudinal axis of connector block 50 and interconnects an opening centrally positioned in inner face 86 with an opening in the rear face 84. Said bore 87 has a diameter greater than the reduced diameter of threaded portion 91 of connecting rod 40 but less than the major diameter of the main portion 88 of said piston rod 40. Threaded portion 91 of the piston rod is secured within bore 87 of the connector block by means of locking nut 92 which is in threaded engagement with the threads of rod 40 so as to secure rear portion 81 against shoulder 93 of piston rod 40, thus rigidly attaching piston rod 40 to connector block 50.

Cast integrally with connector block 50 so as to extend longitudinally through its intermediate portion 82 are two separate passages 97 and 98, each of which is circular in cross section and is in communication at its opposite ends with forward face 85 and with rear face 84 of connecting block 50. That portion of each passage 97 and 98 which lies adjacent to forward face 85 is provided with a threaded counterbore such as bores 89 and 99 (shown in Fig. 12) which are of appropriate size and thread to threadably engage suitable tubing connector fittings 107 and 108 of tubes 47 and 48 respectively of sprayhead support structure 39 (Fig. 3). That portion of each passage 97 and 98 which lies adjacent to rear face 84 is provided with a threaded counterbore such as bores 95 and 96 of Fig. 11 which are threaded to receive tubing connector fittings 73 and 74 of a manifold air tube 67 and of a manifold liquid tube 68 respectively.

At least four and preferably six flat wear plates 79 substantially rectangular in plan view and formed of a bearing metal such as brass or bronze are attached by means of suitable countersunk screws to the upper, lower and side areas of connector block 50 so as to be arranged about four sides of the block with their longitudinal axes parallel to the longitudinal axis of block 50. In our preferred embodiment shown in Figs. 11 and 12, we provide twice the wear plate surface on the upper end and lower faces of block 50 as is provided on the lateral surfaces of block 50 so as to allow the preferred embodiment of our spraying machine 18 to be equally operable in the position shown in Fig. 1 as well as when the machine is rotated from that position about its transverse horizontal axis.

Figure 4:
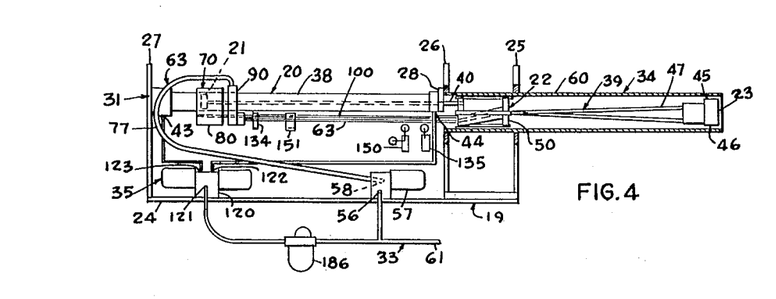
Fig. 4 is a view in side elevation of said embodiment showing said machine in retracted position with some of the valves and with the cover; solenoid compartment and one side of guide tube omitted.
Figure 5:
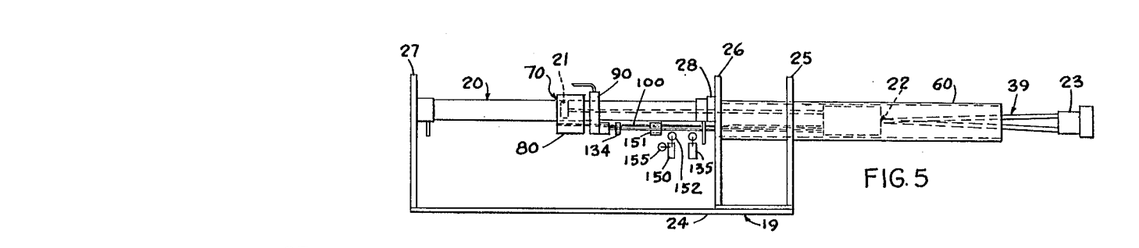
Fig. 5 is a view in side elevation of said embodiment similar to Fig. 4 but with all of the valves and their connections omitted showing said machine on the forward stroke while nearing mold spraying position.
Figure 6:
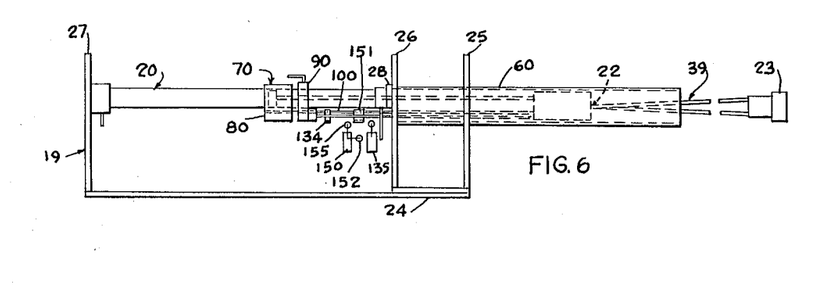
Fig. 6 is a view like Fig. 5 showing the machine on the forward stroke in mold spraying position.
Figure 7:
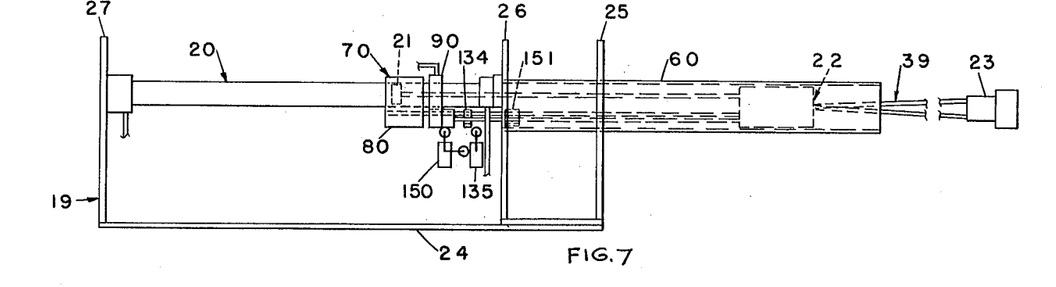
Fig. 7 is a view like Fig. 5 showing the machine at the extreme forward or operative position.

A slide guide sleeve 50 shown in Fig. 4 with the nearer face removed is formed from a suitable length of seamless square metallic tube having appropriate inside height and width dimensions to allow connecting slide structure 22 to fit snugly within said guide sleeve and to slide longitudinally thereof. The rearwardly extending end of guide sleeve 60 is secured within a suitable square opening in rear guide support member 26 of main frame 19. Guide sleeve 60 extends forwardly from rear guide support member 26 through a suitable square opening in forward guide support member 25 wherein sleeve 60 is rigidly secured. Guide sleeve 60 extends forwardly from support 25 with its longitudinal axis parallel to that of connecting rod 40 so as to serve as a passage within which connecting slide structure 22 may be slidably reciprocated by connecting rod 40.

A manifold structure attached to connecting slide 22 at the rear thereof as shown in Figures 9 and 10 is generally designated as 70 and is shown in detail in Figs. 9 and 10. Manifold structure 70 comprises a manifold support 80, a manifold 90, partially flexible air and liquid conduits 63 and 65, and a cam guide bar 100, all of which are described in detail hereafter.

Figure 14:
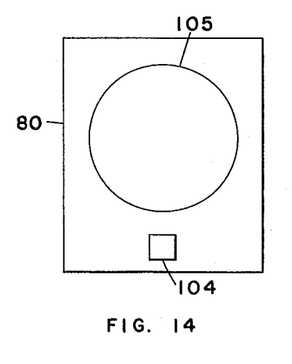
Fig. 14 is a view in elevation of the forward face of the manifold support block.

Manifold support 80 is cast from an appropriate light metal in the form shown in Figs. 9, 10 and 14 and is provided with a transverse bore 105 having a diameter slightly greater than but closely conforming to the outside diameter of cylinder 38 (Fig. 4). Said support 80 is also provided with a transverse passage 104 substantially square in cross section and having interior height and width dimensions slightly greater than, but closely conforming to, the outside height and width dimensions of square cam guide bar 100.

Figure 13:
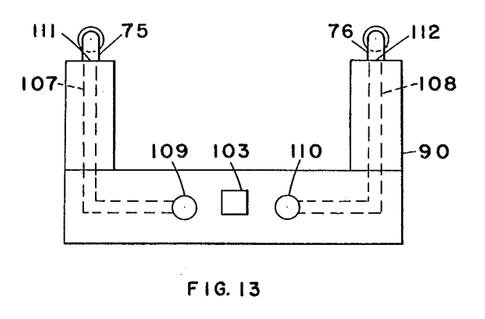
Fig. 13 is a view in elevation of the forward face of the manifold.

Manifold 90 consists of a light metal casting formed as shown in Figs. 9, 10 and 13 and is provided with a transverse passage 103 which is substantially square in cross section and has the same interior dimensions as passage 104 of manifold support 80. Manifold 90 is further provided with interior passage 107 and 108 which terminate at their upper ends in threaded counterbores 111 and 112 adapted to threadably engage suitable elbow fittings 75 and 76. Passages 107 and 108 terminate at their lower ends in threaded counterbores 109 and 110 which are adapted to threably engage suitable tubing connector fittings 71 and 72 of manifold tubes 67 and 68.

Manifold tubes 67 and 68 are formed of suitable metallic tubing and are equipped at their rearward ends with the tubing connectors 71 and 72 and at their forward ends with the similar tubing connectors 73 and 74 whereby said manifold tubes are threadably connected in counterbores 95 and 96 to passages 97 and 98 of connector block 50.

Figure 2:
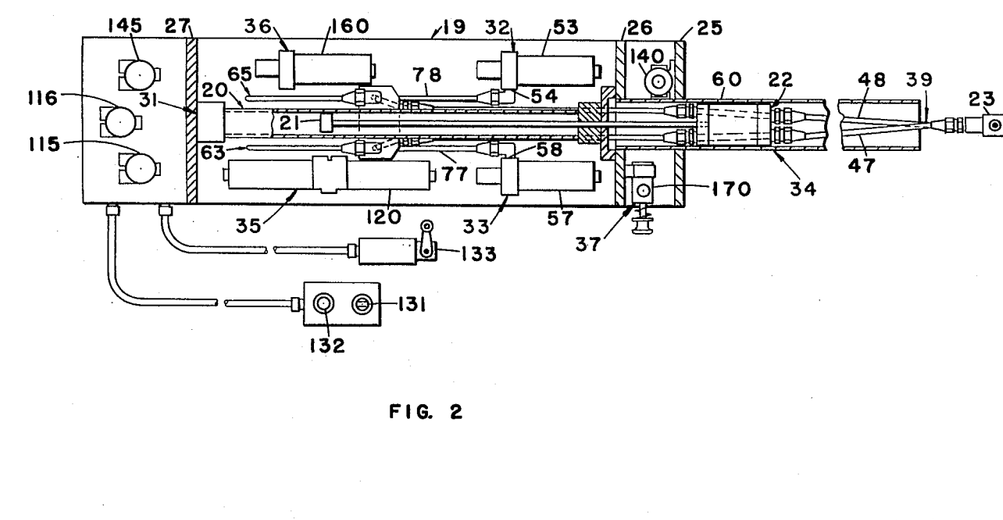
Fig. 2 is a plan view of the preferred embodiment of our device with the outer cover removed, the top of the square tube being broken away and showing the machine on the forward stroke while nearing mold spraying position.

The upper end of each of two flexible hoses 77 and 78 is secured by means of a suitable hose fitting to the rearwardly extending portion of elbow fittings 75 and 76 respectively which are threadably connected to upper counterbores 111 and 112 of manifold passages 107 and 108. The lower end of air hose 77 is connected as shown in Fig. 2 by means of a suitable hose fitting to the outlet orifice 58 of air control valve 57. Liquid hose 78 is similarly connected at its lower end to the outlet orifice of liquid control valve 53.

The partially flexible air supply conduit generally designated in Fig. 9 as 63 comprises flexible air hose 77, elbow 75, manifold air passage 107, fitting 71, air tube 67, fitting 73, connector block air passage 97, and fitting 107, all of which are interconnected as previously described to connect outlet port 58 (Fig. 2) with air delivery tube 47. Partially flexible liquid supply conduit generally designated as 65 in Fig. 9 comprises a flexible liquid hose 78, elbow 76, manifold liquid passage 108, fitting 72, liquid tube 68, connector block liquid passage 98, and fitting 108, all of which are interconnected as previously described to connect outlet port 54 (Fig. 2) to liquid delivery tube 48.

Cam guide bar 100 is a metallic bar of suitable length and substantially square in transverse cross section. The rearward portion of said guide bar 100 is secured by means of suitable set screws or dowels within square passage 104 of manifold support 80. Guide bar 100 extends forwardly from the manifold support 80 and through passage 103 of manifold 90. The manifold 90 may also be rigidly secured in position on said guide bar by means of suitable set screws. A portion of the forwardly extending end of guide bar 100 is secured by suitable means within centrally positioned longitudinal channels 101 and 102 of the lower face of connector block 50.

MEANS FOR CONTROLLING THE CYLINDER AIR SUPPLY

We further provide means whereby air is alternatively admitted to and exhausted from cylinder assembly 20 through ports 43 and 44 to move piston 21 backward and forward. Said means 35 shown in Figs. 3 and 4 comprises a pressure actuated four-way valve 120, solenoid actuated forward control valve 115, forward actuating electrical control system 130 (Fig. 8), solenoid actuated reverse control valve 116, reverse actuating limit switch 135 and cam 134, each of which is described hereafter in detail.

Pressure actuated, two position, four way valve 120, of well known construction, is provided with controlled ports 121, 122 and 123 and 124, and is so arranged that in one position of the valve core air is permitted to pass through the valve from ports 121 to 123 and from ports 122 to 124. When the core is in its alternate position air is permitted to pass from ports 121 to 122 and from ports 123 to 124. Controlled ports 123 and 122 are connected by suitable metallic tubing to ports 43 and 44 respectively of cylinder heads 41 and 42. Port 121 is connected by suitable means to an air compressor 61 (see Fig. 8) or other appropriate source of compressed air and port 124 is similarly connected to connector 166 of retard means 36.

Solenoid actuated, normally closed forward control valve 115, of well known construction, has an inlet port 136, connected by suitable metallic tubing to the source of compressed air 61 and an outlet port 137 which is similarly connected to air port 127 of valve 120. Said valve 115 is actuated by means of a self-contained solenoid winding 117 (see Fig. 8), one side of which is electrically connected directly to one side 137a of a suitable source of electric power. The opposite side of winding 117 is connected by means of forward actuating electrical controls 130 to the opposite or controlled side 137b of said source of power.

Figure 8:
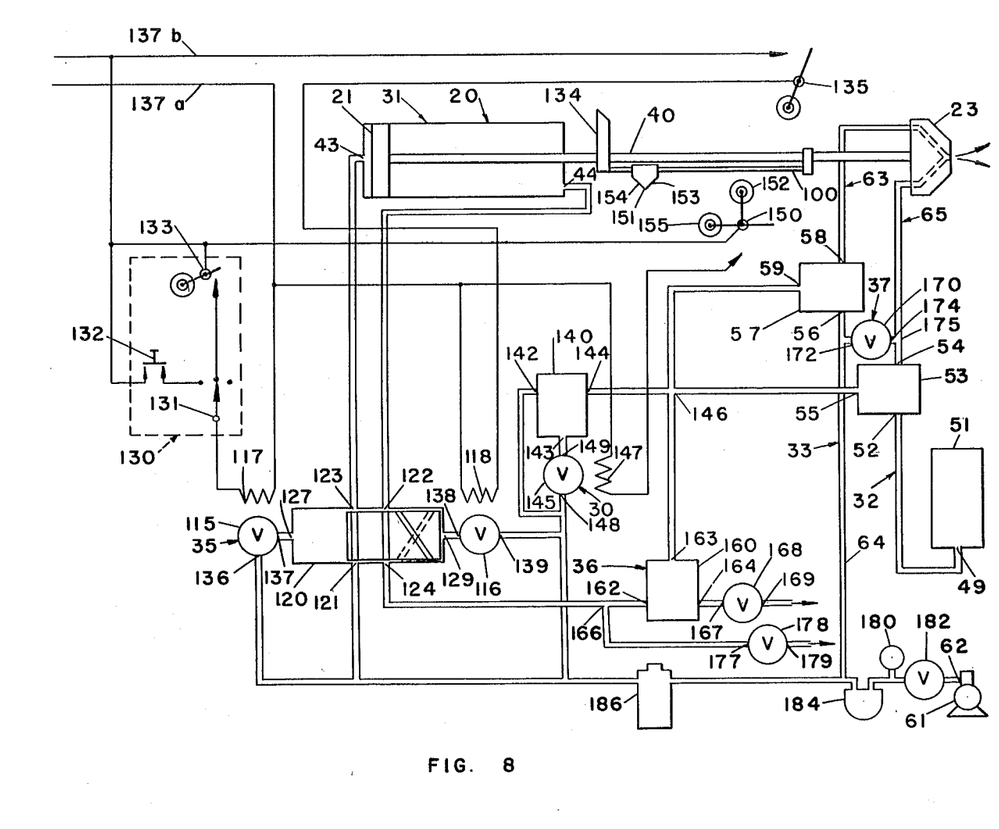
Fig. 8 is a combined schematic diagram of the electrical, mechanical and piping systems of the machine of said embodiment.

The forward actuating electrical control system generally designated as 130 in the schematic diagram of Fig. 8 comprises a three position selector switch 131, a single pole, normally open push button switch 132, and a normally open, lever actuated, single pole limit switch 133. The rotor or common contacting element of selector switch 131 is connected electrically to the controlled side of winding 117 while one alternate contact of said selector switch may be connected manually by means of push button switch 132 to the controlled side 137b of the line. A second alternate contact of switch 131 may be automatically connected by means of limit switch 133 to the controlled side 137b of the line.

Solenoid actuated reverse control valve 116 is a normally closed solenoid valve of well known design and has an inlet port 139 connected by appropriate metallic tubing to a suitable source of compressed air such as 61 and has an outlet port 138 similarly connected to air port 129 of two position valve 120. Said valve 116 is actuated by means of a self-contained solenoid winding 118 (Fig. 8), one side of which is electrically connected directly to one side 137a of a suitable source of electric power. The opposite or controlled side of winding 117 may be connected by means of reversing limit switch 135 to the opposite side 137a of the power source.

Said reversing limit switch 135 is a normally open, lever actuated, single pole limit switch of conventional design so adapted as to be closed by frictional engagement with a cam 134 which is attached by suitable means to cam guide bar 100 which is attached to piston rod 40 as previously described and is moved longitudinally therewith.

MEANS FOR CONTROLLING THE OUTPUT SPRAY

Means 30 for controlling the output spray is shown in Figs. 3 and 8 and comprises a pressure actuated booster air control valve 140, a pilot solenoid valve 145, a two-position limit switch 150 and a cam 151, each of which is described in detail hereafter.

Booster air control valve 140 is a pressure actuated, normally closed valve of conventional construction which is provided with a controlled inlet port 142, a controlled outlet port 144 and an actuating pressure inlet port 143. Controlled inlet port is connected (as shown schematically in Fig. 8) by means of suitable metallic tubing to the source of compressed air 61 and controlled outlet port 144 is connected by means of suitable metallic tubing and a tubing branch connector such as 146 to the actuating pressure inlet port 55 of liquid control valve 53, and to the actuating pressure port 59 of spray air control valve 57.

Booster air control valve 140 is actuated by pressure which is supplied from a normally closed, solenoid actuated, pilot solenoid valve 145 of well known design. Said valve 145 has an inlet port 148 which is connected by suitable tubing to the source of compressed air 61, and an outlet port 149 similarly connected to actuating pressure port 143 of booster air control valve 140. Said pilot solenoid valve 145 is actuated by a self-contained solenoid winding 147 (Fig. 8) one side of which is electrically connected directly to the uncontrolled side 137a of a source of electric power. The opposite or controlled side of winding 147 is connected by means of limit switch 150 to the opposite side 137b of an electric power source.

Limit switch 150 is a two-position, lever actuated, single pole limit switch of conventional design having two cam engaging wheels 152 and 155 as indicated in Fig. 8. Switch 150 is secured by means of a suitable bracket to an element of main frame 19 so as to permit wheel 152 to be engaged by face 153 of overriding cam 151 at an appropriate point in the path of forward travel of cam 151 when propelled by piston rod 40; and to permit wheel 155 to be engaged by face 154 of said cam during the course of its travel in a reverse direction.

Cam 151 is secured by means of suitable set screws to cam guide bar 100 so as to be readily repositioned longitudinally of bar 100 if desired.

MEANS FOR RETARDING THE RATE OF PISTON MOVEMENT

Means 36 whereby the rate of movement of piston 21 and its attached sprayhead 23 may be controlled and automatically retarded during the time that a spray is delivered from sprayhead 23 is provided. Said means comprises a retard control valve 160, an exhaust pressure regulator valve 168 and a retard pressure regulator valve 178, each of which is described hereafter in detail.

Retard control valve 160 is a normally open, pressure actuated control valve of conventional design and has a controlled input port 162, an actuating pressure inlet port 163, and a controlled outlet port 164. Inlet port 162 is connected by means of suitable tubing and a suitable T connector 166 to exhaust port 124 of cylinder control valve 120. Actuating pressure inlet port 163 is connected by suitable tubing to branch connector 146 which is connected to outlet port 144 of valve 140 as previously described. Outlet port 164 of said normally open valve 160 is connected by appropriate tubing to exhaust regulator valve 168.

Valve 168 is a manually controlled pressure regulator valve of well known design adapted to permit the passage of a predetermined minimum volume of air through the valve at all times and has an inlet port 167 and an outlet exhaust port 169. Inlet port 167 of valve 168 is connected by suitable tubing to outlet port 164 of control valve 160 while outlet port 169 of valve 168 may remain open or be connected to a suitable exhaust pipe or manifold.

Retard regulator valve 178 is a manually controlled pressure regulator valve similar to valve 168 but adapted to permit the passage of a maximum volume of air approximately equal to the predetermined minimum allowance of valve 168. Valve 178 has an inlet port 177 which is connected by tubing to the connector 166 which in turn is connected to exhaust port 124 of cylinder control valve 120 as previously described. Outlet port 179 of valve 177 may remain open or it may be connected to a suitable air exhaust pipe or manifold.

MEANS FOR PURGING THE LIQUID CONDUIT AND SPRAY NOZZLE OF UNWANTED LIQUID

Means 37 for purging unwanted liquid from the system consists of a manually operated control valve 170 having an air inlet port 172 connected by suitable tubing to a source of clean, dry air under pressure and an outlet port 174 connected by tubing to the connector 175 in the controlled output port 54 of liquid supply valve 53.

GENERAL DESCRIPTION

The preferred embodiment of our invention also employs an air pressure gauge 180 shown in Fig. 8, and an air pressure regulator 182 of conventional type whereby the operating pressure of the compressed air supplied by compressor 61 and available to all components of our spraying machine may be regulated. A conventional air filter 184 is connected in series with the air supply line to remove foreign matter from the compressed air supply to all components of the machine which might tend to clog the valves or to contaminate the lubricant spray delivered by sprayhead 23. A suitable air lubricator 186 of a type well known in the art is connected in series with the air line through which all actuating compressed air is supplied to the pressure actuated valve and cylinder assembly 20 only. No lubricant is added to the clean, dry compressed air supplied to sprayhead 23 through line 64 except the liquid supplied through line 65 which may in certain cases be a lubricant. Limit switch 133 is secured by suitable means to the associated hydraulic forging press 15 of Fig. 1 so as to be actuated by a moving element of the press when the dies 16 and 17 are not mutually engaged.

OPERATION

When selector switch 131 is adjusted to the position of Fig. 8 for automatic recycling of the spraying device, the actuation of limit switch 133 by press 15 (Fig. 1) energizes winding 117 of solenoid valve 115 so as to open valve 115 and permit lubricated compressed air to pass through valve 115 and into actuating port 127 of four way control valve 120 which moves the core of valve 120 to the position shown in Fig. 8. Valve 120 then allows lubricated compressed air to pass through ports 121 and 123 to port 43 of pneumatic cylinder assembly 20 and allows air from said cylinder assembly to be exhausted through ports 44, 122 and 124, through ports 162 and 164 of normally open control valve 160 and through both exhaust regulator valves 168 and 178. Introduction of compressed air into port 43 of cylinder assembly 20 at the same time that air is able to be exhausted through port 44 causes piston 21 to move forwardly in the cylinder and to drive connecting rod 40, connecting slide structure 22 (Fig. 3) and sprayhead support 39 including sprayhead 23 to the right at a rate of speed determined by the relative adjustments of pressure regulator valve 182 (Fig. 8), exhaust regulator valve 168 and retard regulator valve 178.

Connecting slide structure 22 (Fig. 3) is driven longitudinally within slide guide tube 60 which serves to retain slide structure 22 from rotating about its longitudinal axis. Sprayhead 23 is rigidly attached to slide structure 22 and is also retained by guide tube 60 in predetermined alignment relationship with guide tube 60, frame 19 and with the cooperating dies 16 and 17 of the hydraulic press 15 (Fig. 1).

Connecting rod 40 carries with it cam guide bar 100 and its attached cams 134 and 151 (Figs. 4 and 8). Cam 151 overrides wheel 152 of limit switch 150 so as to move the switch to the closed contact position and thereby energize winding 147 of solenoid valve 145 and open said valve. Valve 145 then permits lubricated compressed air to enter actuating port 143 and open valve 140. When valve 140 is opened, lubricated compressed air is allowed to enter actuating ports 59, 55 and 163 of control valves 57, 53 and 160 respectively so as to open valves 57 and 53 and to close valve 160.

Opening valves 57 and 53 allows clean compressed air and liquid to pass through conduits 63 and 65 respectively to sprayhead 23 from which the air and liquid are projected as an atomized spray. The simultaneous closing of normally open control valve 160 serves to check the passage of exhaust air from cylinder assembly 20 through control valve 160 and regulator valve 168 and thereby limits the rate of passage of exhaust air to that permitted by retard regulator valve 178 which can be manually adjusted to so restrict the passage of exhaust air as to reduce the rate of travel of piston 21 during that phase of the operating cycle of the spraying device when limit switch 150 is in the closed position and a spray is being delivered from sprayhead 23.

After additional forward movement of piston 21, cam 134 engages limit switch 135 so as to close an electrical circuit through said switch and thereby energize solenoid winding 118 and open solenoid valve 116 allowing lubricated compressed air to enter four way valve 120 through port 129 and to move the core of valve 120 to a control position the reverse of that shown in Fig. 8. In the reverse control position valve 120 permits lubricated compressed air to travel from port 121, through port 122 and to enter cylinder assembly 20 through port 44; and permits air to be exhausted from the cylinder through port 43 and to pass through ports 123 and 124 of valve 120 and through retard regulator valve 178.

Piston 21 is then caused to move in a reverse direction toward the left in Fig. 8 carrying with it piston rod 40 and cam 151. During the reverse travel of cam 151 its face 154 engages and overrides wheel 155 of limit switch 150 causing the electrical circuit through said switch to be broken and thus deenergizing winding 147. When winding 147 is deenergized, normally closed valve 145 returns to the closed position shutting off the actuating air pressure to normally closed control valve 140 which then closes. Closing valve 140 checks the actuating air pressure to control valves 57 and 53 and allows them to resume their normally closed positions and thus shut off the supplies of dry air and liquid to sprayhead 23. The closing of valve 40 also serves simultaneously to check the actuating air pressure to retard control valve 160 and thus allow said valve to resume its normally open position and permit air from cylinder assembly 20 to be exhausted through control valve 160 and regulator valve 168. Valve 168 may be adjusted to permit unrestricted passage of exhaust air and thus allow sprayhead 23 to be retracted from spraying position to a position which will not interfere with subsequent cooperative engagement of dies 16 and 17.

When selector switch 131 is repositioned from the automatic recycling position shown in Fig. 8 to a manual recycling position in which the controlled side of solenoid winding 117 is electrically connected to one side of normally open push button switch 132, the spraying device may be recycled manually by closing switch 132 to energize winding 117 and thus initiate by manual means a cycle of operation of our improved spraying device.

When the spraying device is expected to be out of operation for an extended period the liquid remaining in liquid conduit 65 may be purged from the conduit by opening manually operated, normally closed control valve 170 which permits dry compressed air to enter conduit 65 at a point in the conduit adjacent to outlet port 54 of the liquid control valve 53. Such introduction of compressed air serves to force undesired lubricant from conduit 65 and clear it of all material which will tend to solidify in the conduit during periods of inactivity and serve to clog the nozzles of sprayhead 23 when operation is resumed.

We claim:

1. In a device for applying a spray to the interior of a mold cavity, a piston movable from a retracted position to an operative position and from said operative position to said retracted position; a spray nozzle secured to said piston and normally positioned adjacent to mold cavity when the piston is in the operative position; means comprising an air cylinder, operatively connected with said piston, for moving said piston from its retracted position to its operative position and from its operative position to its retracted position; means, connected with said spray nozzle, for supplying liquid to said spray nozzle; means, connected with said spray nozzle, for supplying air under pressure at times to said spray nozzle to eject said liquid as a spray from said spray nozzle into said mold cavity; valves, associated with said air supply means, controlling said supply of air under pressure; means, associated with said valves, operated by said piston and operative as said piston approaches said operative position for opening said valves and forcing said liquid in a spray from said spray nozzle into said mold cavity; means, associated with said valves, operated by said piston, and operative as said piston departs from said operative position, for closing said valves; and means, associated with said air cylinder, operated by said piston and operative while said piston is in the vicinity of said operative position for retarding the movement of said piston.

2. In a device for applying a spray to the interior of a mold cavity; a piston movable from a retracted position to an operative position and from said operative position to said retracted position; a spray nozzle secured to said piston and normally positioned adjacent to said mold cavity when the piston is in the operative position; means comprising an air cylinder, operatively connected with said piston, for moving said piston from its retracted position to its operative position and from its operative position to its retracted position; means, connected with said spray nozzle and including a liquid supply conduit for supplying liquid to said spray nozzle; means, connected with said spray nozzle, for supplying air under pressure at times to said spray nozzle to eject said liquid as a spray from said spray nozzle into said mold cavity; a valve, associated with said liquid supply conduit, for controlling said liquid supply conduit; a valve, associated with said air supply, means for controlling said supply of air under pressure; means associated with said liquid supply valve and said air supply control valve, operated by said piston and actuated as said piston approaches said operative position for opening said liquid supply valve and said air supply control valve and for forcing said liquid in a spray from said spray nozzle into said mold cavity; and means operated by said piston and actuated as said piston departs from said operative position for closing said valves, and means associated with said liquid supply valve and said air supply control valve, operated by said piston, and actuated as said piston departs from said operative position for closing said valves.

3. A device for applying a spray to the interior of a die cavity comprising a piston movable from a retracted position to an operative position and from said operative position to said retracted position; a spray nozzle secured to said piston; means for moving said piston from its retracted position to its operative position and from its operative position to its retracted position; means for supplying liquid to said spray nozzle; means for supplying at times air under pressure to said spray nozzle; and means for retaining said spray nozzle in constant angular alignment with a transverse plane of said die cavity, in which the means for retaining said spray nozzle in constant angular alignment comprises a connector block of polygonal cross section, having longitudinal air and liquid passages, being rigidly secured at one end to a pneumatic piston and at its opposite end to said spray nozzle, and being provided with wear plates on its top, bottom and sides; a metallic tube of polygonal cross section adapted to slidably contain said connector block and being rigidly attached to a pneumatic cylinder; an air and liquid supply manifold having separate interior air and liquid passages connected by flexible means to air and liquid control valves, and to air and liquid passages of said connector block; and a spraying head provided with a spray nozzle connected to air and liquid passages of said connector block.

4. A device for applying a spray to the interior of a die cavity comprising a piston movable from a retracted position to an operative position and from said operative position to said retracted position; a spray nozzle secured to said piston; means for moving said piston from its retracted position to its operative position and from its operative position to its retracted position; means for supplying liquid to said spray nozzle; means for supplying at times air under pressure to said spray nozzle; and means for retaining said spray nozzle in constant angular alignment with a transverse plane of said die cavity, in which the means for retaining said spray nozzle in constant angular alignment comprises a connector block of polygonal cross section, having longitudinal air and liquid passages, being rigidly secured at one end to a pneumatic piston and at its opposite end to said spray nozzle; a metallic tube of polygonal cross section adapted to slidably contain said connector block and being rigidly attached to a pneumatic cylinder; an air and liquid supply manifold having separate interior air and liquid passages connected by flexible means to air and liquid control valves, and to air and liquid passages of said connector block; and a spraying head provided with a spray nozzle connected to air and liquid passages of said connector block.

5. A device for applying a spray to the interior of a die cavity comprising a piston movable from a retracted position to an operative position and from said operative position to said retracted position; a spray nozzle secured to said piston; means for moving said piston from its retracted position to its operative position and from its operative position to its retracted position; means for supplying liquid to said spray nozzle; means for supplying at times air under pressure to said spray nozzle; and means for retaining said spray nozzle in constant angular alignment with a transverse plane of said die cavity, in which the means for retaining said spray nozzle in constant angular alignment comprises a connector block of polygonal cross section being rigidly secured at one end to a pneumatic piston and at its opposite end to a spray nozzle; a metallic tube of polygonal cross section adapted to slidably contain said connector block and rigidly attached to a penumatic cylinder adapted to cooperate with said piston; an air and liquid supply manifold having separate interior passages connected by flexible means to air and liquid control valves; and a spray nozzle connected to air and liquid passages of said manifold.

6. A device for applying a spray to a mold comprising a fluid motor having a longitudinally reciprocable piston; a plurality of air and liquid supply tubes secured to said piston and driven reciprocally by said piston; a sprayhead secured to and supported by said tubes and driven reciprocally therewith and having a plurality of bores formed therein; a plurality of spraying nozzles formed within said sprayhead, the bores formed within said sprayhead being in intercommunication with said tubes and with said nozzles; means, comprising a conduit connected to said nozzles, for supplying a liquid to said nozzles; means, comprising a conduit connected to said nozzles, for supplying aid under pressure to said nozzles at the times when said piston has been reciprocated outward to position the sprayhead within said mold; means comprising a guide sleeve secured to said motor for retaining said nozzles in constant angular alignment with the axis of reciprocation of said piston; and means comprising an exhaust control valve connected to said motor for retarding the rate of reciprocal movement of said piston when said piston is in said outwardly reciprocated position.

7. A machine for simultaneously coating a plurality of dies comprising a piston; a connector block having a plurality of fluid passages formed therein and rigidly secured to said piston; a plurality of fluid delivery tubes each secured at one of its ends to said connector block, and each having a central passage in communication with one of said fluid passages; a sprayhead rigidly secured to the opposite end of each of said delivery tubes; means comprising a plurality of spraying nozzles formed with said sprayhead for projecting separate sprays in a plurality of directions from said sprayhead; said sprayhead having a plurality of input bores formed in said sprayhead so that each of said input bores is in communication at one of its ends with one of said central passages and so that all of said input bores are in communication at their opposite ends with said nozzles; means comprising a fluid cylinder in which a portion of said piston moves for moving said piston from a retracted position to an extended position; means comprising a guide sleeve fixedly secured to said cylinder and in frictional engagement with said connector block for retaining said nozzles in predetermined angular relationship with said cylinder; means, comprising a conduit connected to one of said fluid passages, for supplying a coating liquid to at least one of said fluid passages so as to spray said liquid from said nozzles to said dies; means, comprising a valve asociated with said conduit, for actuating the coating liquid supplying means when said piston approaches said extended position and for deactuating said coating liquid supplying means when said piston approaches the retracted position; and means, comprising an exhaust conduit and a valve associated therewith, for retarding the rate of movement of said piston when it approaches said extended position and for accelerating said rate of motion when said piston approaches the retracted position.

8. In a device for supplying a spray to the interior of a die cavity; a pneumatic piston movable from a retracted position to an operative position, and from said operative position to said retracted position; a spray nozzle secured to said piston; means comprising a pneumatic cylinder in which said piston is partially contained for moving said piston from its retracted position to its operative position and from its operative position to its retracted position; means comprising a conduit connected to said spray nozzle for supplying liquid to said spray nozzle; means comprising a conduit connected to said spray nozzle for supplying air under pressure at times to said spray nozzle; means for retaining said spray nozzle in constant angular alignment with a transverse plane of said die cavity comprising a connector block of polygonal cross-section, having longitudinal air and liquid passages, being rigidly secured at one end to said pneumatic piston and at its opposite end to said spray nozzle, a metalic tube of polygonal cross-section adapted to slidably contain said connector block and being rigidly attached to the pneumatic cylinder; an air and liquid supply manifold having separate interior air and liquid passages, air and liquid control valves, flexible means connecting said manifold to said control valves to the air and liquid passages of said connector block; and means connecting said spray nozzle and the air and liquid passages of said connector block.

9. In a device for supplying a spray to the interior of a die cavity; a piston movable from a retracted position to an operative position, and from said operative position to said retracted position; a spray nozzle secured to said piston; means for moving said piston from its retracted position to its operative position and from its operative position to its retracted position; means for supplying liquid to said spray nozzle; means for supplying air under pressure at times to said spray nozzle; and means for retaining said spray nozzle in constant angular alignment with a transverse plane of said die cavity comprising a connector block of polygonal cross-section, having longitudinal air and liquid passages, being rigidly secured at one end to said piston and at its opposite end to said spray nozzle, a metallic tube of polygonal cross-section adapted to slidably contain said connector block and being rigidly attached to the pneumatic cylinder; an air and liquid supply manifold having separate interior air and liquid passages, air and liquid control valves, flexible means connecting said manifold to said control valves and to the air and liquid passages of said connector block; and means connecting said spray nozzle to the air and liquid passages of said connector block.

References Cited in the file of this patent

UNITED STATES PATENTS

| | | |
|---|---|---|
| 954,241 | Affelder et al. | Apr. 5, 1910 |
| 2,210,934 | Gleason | Aug. 13, 1940 |
| 2,695,592 | Szczepanski | Nov. 30, 1954 |

UNITED STATES PATENT OFFICE
CERTIFICATE OF CORRECTION

Patent No. 2,929,564                      March 22, 1960

Franz T. Stone III et al.

It is hereby certified that error appears in the printed specification of the above numbered patent requiring correction and that the said Letters Patent should read as corrected below.

Column 5, lines 1 and 2, for "upper end and lower faces" read -- upper and lower faces --; line 8, for "guide sleeve 50" read -- guide sleeve 60 --; line 46, for "passage" read -- passages --; line 51, for "threably" read -- threadably --; column 8, line 52, for "valve" read -- valves --; column 12, line 23, for "aid under pressure" read -- air under pressure --.

Signed and sealed this 15th day of November 1960.

(SEAL)
Attest:

KARL H. AXLINE                              ROBERT C. WATSON
Attesting Officer                           Commissioner of Patents